No. 733,033. PATENTED JULY 7, 1903.
T. M. GRIFFIN.
PLANTER.
APPLICATION FILED AUG. 7, 1902.
NO MODEL. 2 SHEETS—SHEET 1.
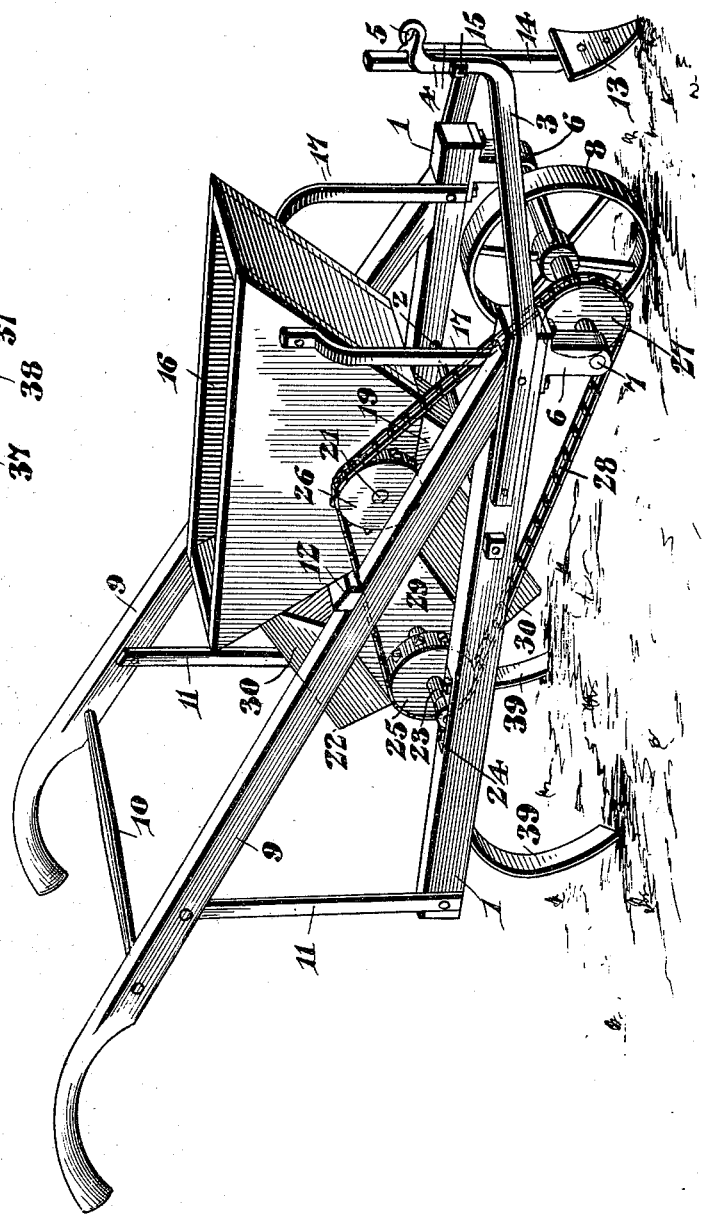
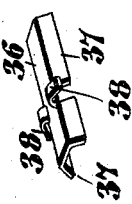
T. M. Griffin, Inventor
Witnesses No. 733,033. PATENTED JULY 7, 1903.
T. M. GRIFFIN.
PLANTER.
APPLICATION FILED AUG. 7, 1902.
NO MODEL. 2 SHEETS—SHEET 2.

T. M. Griffin, Inventor

Witnesses

No. 733,033.
Patented July 7, 1903.

UNITED STATES PATENT OFFICE.

THOMAS M. GRIFFIN, OF LENDERMAN, SOUTH CAROLINA.

PLANTER.

SPECIFICATION forming part of Letters Patent No. 733,033, dated July 7, 1903.

Application filed August 7, 1902. Serial No. 118,810. (No model.)

*To all whom it may concern:*

Be it known that I, THOMAS M. GRIFFIN, a citizen of the United States, residing at Lenderman, in the county of Greenville and State of South Carolina, have invented a new and useful Planter, of which the following is a specification.

This invention relates to planters, and has for its object to provide an improved device of this character which is especially adapted for planting cotton-seed and is also provided with means for distributing fertilizer in connection with the planting operation. Furthermore, it is designed to provide improved seed-dropping means which is arranged to deposit the seed at regular intervals without scattering the seed broadcast and also to arrange for dropping more or less seed, according to the desire of the operator.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 4:
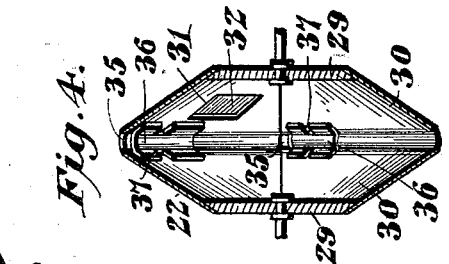
Figure 2:
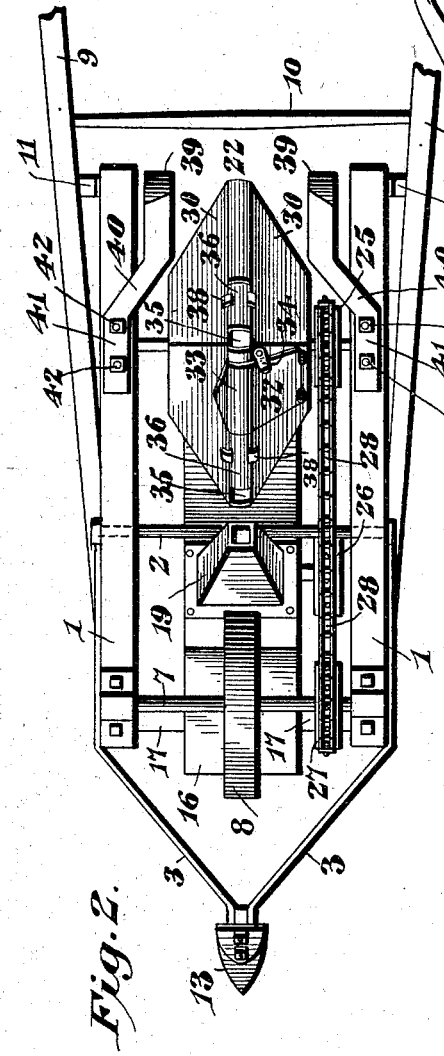
Figure 3:
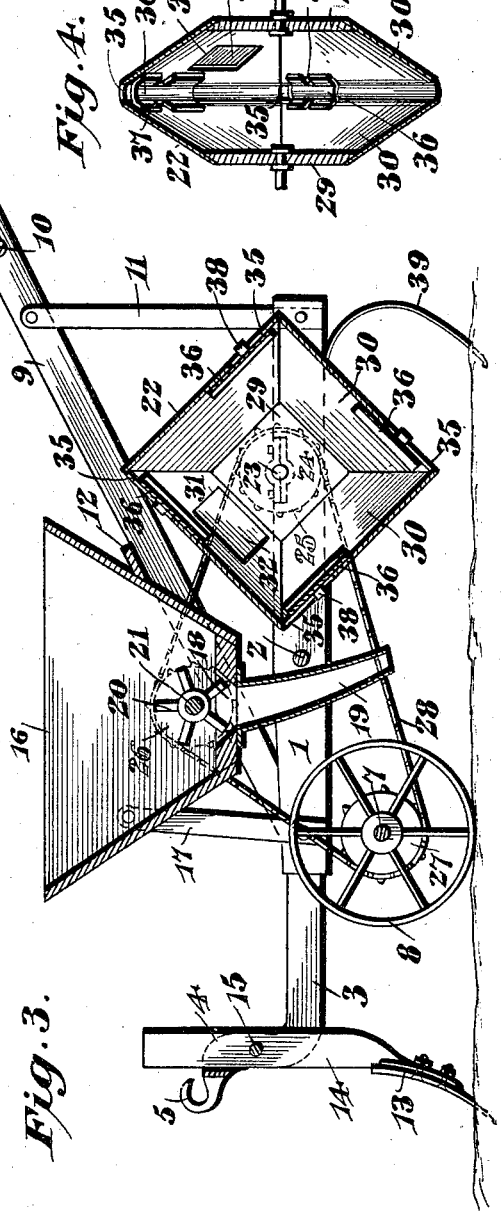

In the drawings, Figure 1 is a perspective view of a planter constructed and arranged in accordance with the present invention. Fig. 2 is an inverted plan view thereof. Fig. 3 is a longitudinal sectional view. Fig. 4 is a cross-sectional view of the seed-hopper. Fig. 5 is a detail perspective view of one of the adjustable cut-off slides for the seed-hopper.

Like characters of reference designate corresponding parts in all of the figures of the drawings.

The frame of the present device is composed of a pair of longitudinal beams 1, which are connected at an intermediate point by means of a transverse metallic rod or bar 2, the forward ends of the beams being embraced by and secured to the rear ends of a draft-yoke 3, which has the forward ends of its opposite sides extended upwardly, as at 4, and separated by an intervening space, the upper ends of the upstanding portions 4 being formed into a hook 5 for connection with a draft device. A pair of brackets or hangers 6 depend from the forward ends of the frame-beams and support a shaft 7, which has an intermediate wheel 8 for the support of the device. The handles 9 incline upwardly and rearwardly from the front ends of the beams 1 and are connected near their rear ends by means of a cross-bar 10, there being suitable standards 11 rising from the rear ends of the beams and connected to the handles. An intermediate cross-bar 12 also connects the handles.

At the front of the device there is a suitable opener 13, which is carried by the lower end of a standard 14, the upper end of the latter being disposed between the upstanding portions 4 of the yoke 3 and secured thereto by means of a bolt or other suitable fastening 15. The clevis or draft-hook 5, which is located at the top of the upwardly-extending portions of the draft-yoke, is located at the front edges thereof, and the shank or standard 14 of the soil-engaging device or opener 13 is secured to the upwardly-extending portions at a point below and in rear of the draft-hook. By this construction one bolt only is necessary for attaching the shank or standard, as the upper portion of the latter will engage the clevis or draft-hook and be prevented from swinging forward beyond a perpendicular position. As clearly indicated in Fig. 2, it will be seen that the wheel 8 is arranged in rear of the opener 13, so as to run in the furrow and pack the soil therein.

Located between the intermediate cross-bar 12 and the front portion of the frame is a fertilizer-hopper 16, which is disposed above the beams 1 with its rear end portion lying against and secured to the cross-bar 12, its front end being supported by means of metallic upstanding brace-bars or standards 17, which rise from the beams and are connected to the opposite sides of the front portion of the hopper. As best illustrated in Fig. 3, it will be seen that the bottom of the hopper terminates above the beams 1 and is provided with a bevel discharge-opening 18, from which leads a discharge-spout 19, that extends downwardly and is arranged in rear of the wheel 8, so as to effectually drop the fertilizer into the bottom of the furrow. An agitating device 20 is mounted within the hopper, so as to work within the beveled opening 18, and is carried by a transverse shaft 20, which has bearings in the opposite sides of the hopper and is driven from the shaft of the supporting-wheel, as will be hereinafter described.

In rear and slightly below the fertilizer-hopper is a rolling polygonal seed-hopper 22, which is provided at opposite ends with journals 23, that are mounted in suitable bearings 24, carried by the longitudinal beams of the main frame. One of the journals 23 is provided with a sprocket-wheel 25, and on the corresponding end of the shaft 21 of the fertilizer-hopper is a sprocket-wheel 26, while the supporting-shaft 7 is provided with a sprocket-wheel 27, all of these sprocket-wheels being in the same vertical plane, so as to engage an endless sprocket-chain 28, whereby the seed-distributing hopper and the agitator of the fertilizer-hopper are simultaneously driven from the shaft of the supporting-wheel.

The rolling seed-hopper has opposite heads 29, each of which is polygonal in shape, and while it may have as many sides as desired I have shown the head or end in the form of a square or quadrilateral. The intermediate periphery of the hopper of course corresponds in shape to the heads or ends, and the sides 30 diverge from the intermediate periphery to the respective heads, as best illustrated in Fig. 4 of the drawings. The intermediate periphery of the rolling seed-hopper and the inclined sides 30 thereof are formed by a single sheet of metal, which extends entirely across the space between the heads, and these plates are arranged at an angle to each other to form the polygonal hopper and are united at their adjacent edges, one plate at each corner being provided with an opening, hereinafter described, for dropping seed and the other plate being imperforate. Access is had to the interior of the hopper for introducing seed thereto through an opening 31, formed in one of the inclined sides and normally closed by means of a cover or closure 32, which is hinged to the hopper so as to swing toward and away from the opening 3, with its free end bent or curved, as at 33, to fit over the intermediate periphery, there being a suitable button or pivotal keeper 34, mounted upon the hopper and capable of being turned across the cover or closure to hold the same against accidental displacement. To drop the seed from the hopper, the intermediate peripheral edge of each side is provided with the longitudinal opening 35, said opening extending from and at one side only of the vertex or meeting-point of the adjacent peripheral edge portions. These openings are arranged in regular order—that is to say, at corresponding ends of the several peripheral edge portions—and are located so as to lie in rear of the adjacent corner or vertex when at its lowermost limit. By this arrangement the seed is discharged in a rearward direction and is prevented from being scattered broadcast. For regulating the size of each opening there is provided an endwise-shiftable cut-off slide 36, located in the angle between adjacent sides and provided with diverged longitudinal flanges 37 to lie against said sides, intermediate portions of the flanges being bent outwardly to form guideways or projections 38, which lie upon the exterior of the adjacent sides of the hopper, so as to guide the slide and to form a convenient finger-piece for shifting the slide in an endwise direction to vary the size of the adjacent opening. It will of course be understood that the ears 38 are somewhat elastic, so as to snugly embrace the sides of the hopper, and thereby prevent accidental displacement of the slide, while permitting forcible adjustment thereof.

In rear of the seed-hopper are a pair of covers 39, each of which is provided at its upper end with a lateral outwardly-inclined shank portion 40, which terminates at its front end in a straight forward extension 41, which is secured to the under sides of the adjacent beam 1 by means of the fastenings 42, which secure the adjacent bearing 24 to the beam.

What I claim is—

1. A planter provided with a rotary polygonal seed-hopper comprising heads arranged at opposite sides of the hopper, and continuous plates extending entirely across the space between the heads and bent at opposite sides of the center to form intermediate peripheral portions and inclined side portions, said plates being united at their adjacent edges, one of the plates at each corner or angle being slotted and the other plate being imperforate, and means for varying the size of the slots, substantially as described.

2. A planter provided at its front with an approximately V-shaped draft-yoke extending forward from the frame of the planter and provided at the front or apex with upwardly-extending portions spaced apart, said draft-yoke being also provided with a clevis connecting the terminals of the upwardly-extending portions, and a soil-engaging device having a shank or standard secured between the upwardly-extending portions of the draft-yoke, substantially as described.

3. In a planter, the combination of a frame, an approximately V-shaped draft-yoke secured to the frame and provided at its front or apex with upwardly-extending portions spaced apart, a clevis-hook connecting the upwardly-extending portions at the top thereof, and a soil-engaging device having a shank or standard arranged between the upwardly-extending portions of the draft-yoke and secured to the said portions at a point below and in rear of the clevis-hook, substantially as described.

In testimony that I claim the foregoing as my own I have hereto affixed my signature in the presence of two witnesses.

THOMAS M. GRIFFIN.

Witnesses:
P. C. ASHMORE,
J. R. HENDERSON.